United States Patent [19]
Arpin

[11] Patent Number: 6,053,618
[45] Date of Patent: Apr. 25, 2000

[54] MEDICAL MIRROR-SELF TREATMENT

[76] Inventor: P. Paul Arpin, 1347 Highland Ct., Milpitas, Calif. 95035

[21] Appl. No.: 08/887,207

[22] Filed: Jul. 2, 1997

Related U.S. Application Data

[60] Provisional application No. 60/021,900, Jul. 5, 1996.
[51] Int. Cl.$^7$ .................................................. G02B 7/182
[52] U.S. Cl. ........................................... 359/872; 248/474
[58] Field of Search .................................. 359/871, 872, 359/879; 248/474, 479, 486, 488

[56] References Cited

U.S. PATENT DOCUMENTS

| | | | |
|---|---|---|---|
| D. 317,680 | 6/1991 | Smith | D6/309 |
| 898,263 | 9/1908 | Rice | 248/474 |
| 2,167,795 | 8/1939 | Bentz | 4/574.1 |
| 2,652,479 | 9/1953 | Wilson | 362/382 |
| 3,373,448 | 3/1968 | Butler | 4/605 |
| 4,966,450 | 10/1990 | Mori | 385/137 |
| 5,124,858 | 6/1992 | Goetz | 359/872 |
| 5,453,915 | 9/1995 | Bradley, III | 362/144 |
| 5,681,100 | 10/1997 | Powell | 227/337 |

*Primary Examiner*—Cassandra Spyrou
*Assistant Examiner*—Mark A. Robinson

[57] ABSTRACT

A lightweight mirror-reflective surface mounted in a rigid frame embodying a transverse support axle. The rigid mirror-reflective surface frame and transverse support axle are rigidly attached and rotate in unison about the transverse support axle. The threaded axle extension is introduced through thimble holes located at the apex perpendicularly distant from the base of the support legs. Threaded securing knobs are torqued to a tightness about support axle to stabilize the mirror body and the support legs in the desired positions. Support legs can rotate about the mirror body support axle permitting the base of the support legs to accomodate to an uneven or nonparallel resting surface such as a bed. The device also embodies a supply shelf affixed to the support legs for the purpose of holding medical supplies. The complimentary set of support legs embodies a set of hooks for the attachment of a waste disposal container. A rotatable lightsource-flashlight clamp is frictionally held on the support legs enabling the light source to be focused on any three axis position.

2 Claims, 3 Drawing Sheets

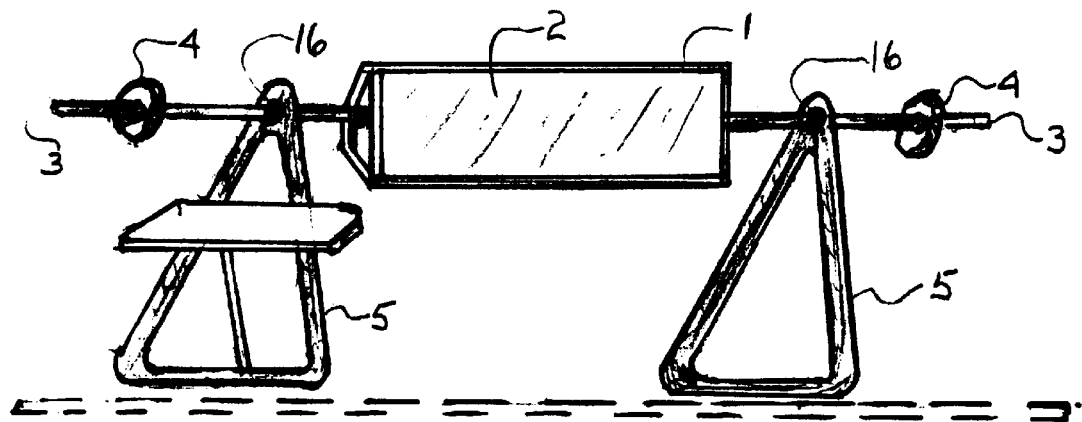
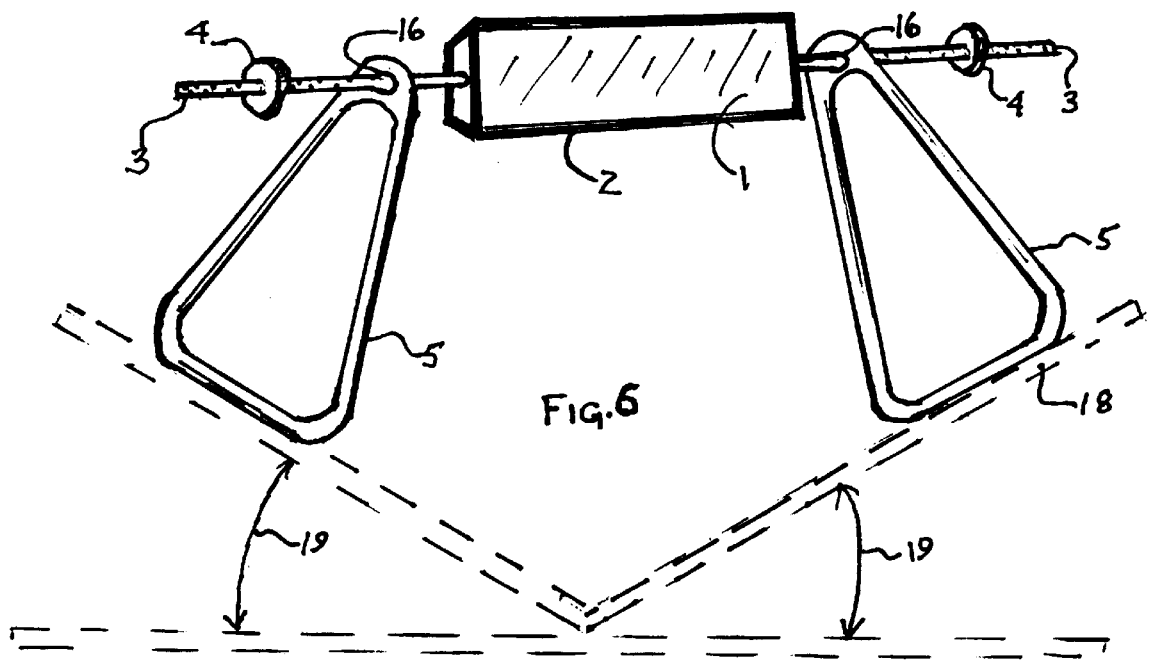

MEDICAL MIRROR-SELF TREATMENT

This application claims the benefit of U.S. Provisional Application Ser. No. 60/021,900 filed Jul. 5, 1996.

BACKGROUND

The trend toward more "out patient" procedure and treatment along with shorter hospital stays and escallating hospital costs medical treatment increasingly becomes the responsibility of the patient-user. Some procedures require an unobstructed view of the concerned treatment areas. In many instances, the contorting of the body for a better view of the treatment area adds to the distress of the patient-user and a closure to view of the intended treatment site.

The invention I submit was developed as a result of a need that is not now being served As a patient I experienced a need a need for a device which would make continuing care possible. The condition was created by a lingering infection contracted after an invasive operation which left me with an open wound which required constant dressing changes. The time for closure of the wound was judged in weeks or months. The condition required constant care but not hospital confinement. The condition for which I needed treatment was one obscured to my vision. When I bent over to treat the site, the site became closed due to my body bending. The only way to self treat the site was to lie extended to remotely view the area of concern.

The solution to the continuing problem was to expose the site to my vision while in a prone or streched out posture commensurate with the treatment. A fixed mirror would not bring into view the treatment area while in the required body position and any hand held device would not free the hands to perform the treatment. Any existing devices were not adaptable to the uneven surface of the bed. By developing a device with a mirror suspended between two triangular shaped supporting legs with the ability to accomodate to an uneven surface and being able to rotate about the supporting axle of the mirror I was able to develop a device which would be stable on the resting surface and free the hands to perform the medical procedure. The procedures were amply performed by use of the medical-mirror using reflection to view the area.

The ability to perform the procedure in a home atmosphere substituted for hospital confinement. Excellent results were achieved. The alternative option of adequate care at home or confinement to a hospital or undependable schedule of visiting nurse is immediately apparent.

The cost of the medical-mirror is very favorable with the cost of one professional treatment or visit. Monitoring and education of the patient becomes a co-operative process with health care professionals. The procedures can be done on an as needed basis instead of waiting for appointments or visiting nurse schedules.

Performing procedures in a timely fashion can prevent medical deterioration and can give warning to need for professional attention.

I have found a neglected need in the health industry and have invented the medical-mirror proposed.

SUMMARY OF INVENTION

The purpose of the invention is to provide a device which will enable a patient-user access to areas of the body parts not visible or obstructed to forward vision.

The invention uses a mirror to expose the areas of concern by reflected vision with the ability to illuminate the affected areas with an attached light source-flashlight.

The invention permits the patient-user to assume a body position which will achieve optimal body comfort and maximum area exposure.

The invention presented provides an independently standing mirror supported by a pair of preferrably triangular shaped support legs. These legs are free to rotate about said mirror support axle which allow the base of support legs to rest on an uneven surface such as a bed while providing a stabile support for the mirror body. The base of the triangular legs provide a surface contact with the bed surface assuring stability of the supported mirror body.

The mirror body is mounted at the apex of the support leg triangle opposite from the base of the support triangle.

My invention has a flashlight holder clamp which is attached to a leg support leg clamp by a swivle connector pin allowing three axis rotation and placement of the flashlight to achieve a light beam in any direction.

My invention has a supply shelf mounted on support legs and within easy reach of the patient-user. Supply shelf is retractable by demounting the shelf support post from the base socket and placing support post in the securing post storage clamp.

Materials of choice are PVC or similar plastics. Flashlight and support post clamps are made of material which have a memory when bent allowing flashlight and support post leg clamps to maintain a frictional grip on the flashlight and the support post after the clamps are snapped into position. Materials are preferred but not limited to the stated above.

BRIEF DESCRIPTION OF THE DRAWINGS

FIG. 5 shows the device of FIG. 1 resting on a planar surface.

FIG. 6 shows the device of FIG. 1 resting on an uneven surface.

BRIEF DESCRIPTION OF DRAWINGS

Figure 1:
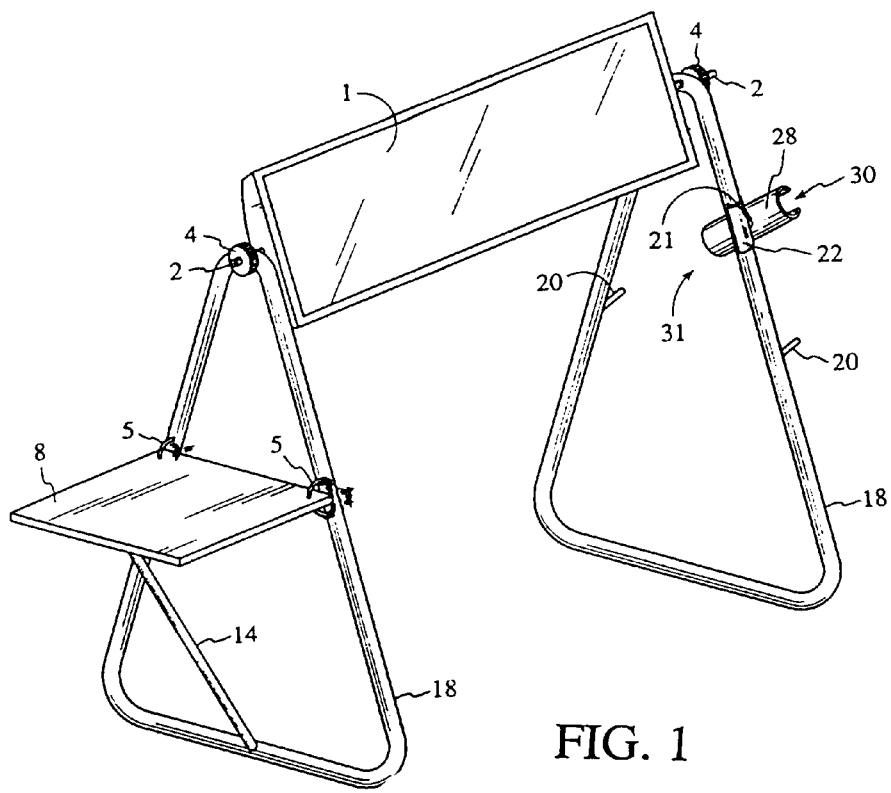
FIG. 1 is a side elevation of a medical mirror self-treatment device according to the present invention.
Figure 2:
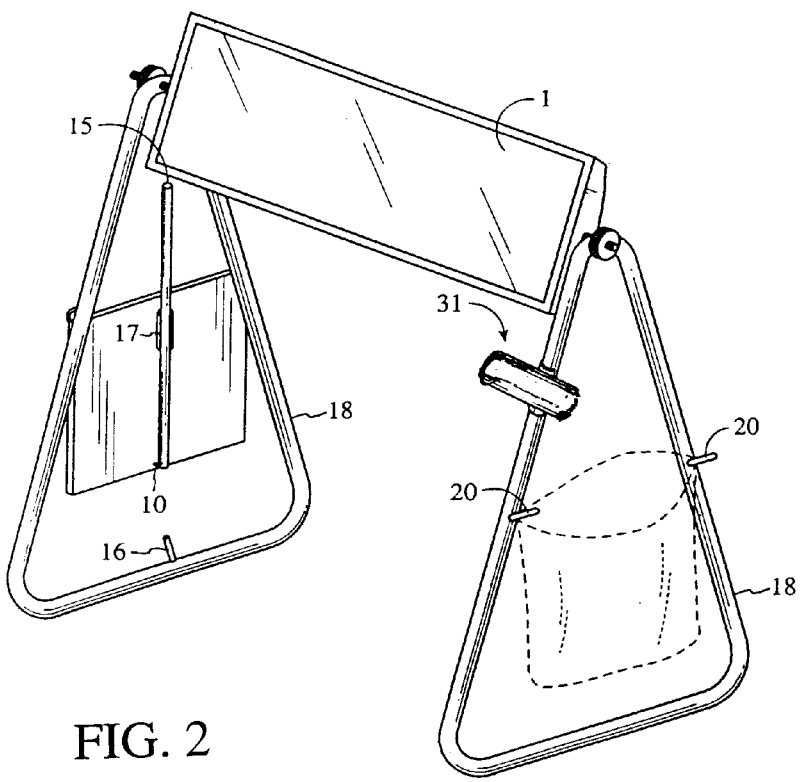
FIG. 2 shows the device of FIG. 1 with the supply shelf retracted.

As can be seen by reference to the drawings and in particular the construction of the present invention is designated generally by FIG. 1 and FIG. 2 comprising a lightweight portable mirror for the purpose of medical self examination and treatment.

FIG. 1 is a side elevation from the supply shelf side showing mirror-reflective surface 1 mounted in a mirror support frame body 2 suspended between mirror support legs 5—5 by a threaded transverse support axle 3—3 which is located at the apex of mirror support legs 5—5 and supported by mirror support legs 5—5. Mirror support body frame 2 and mirror support legs 5—5 are fastened to use position by threaded axle securing knob 44 Threaded axle securing knobs 4—4 are torqued to a degree which causes a tightening of mirror support legs 5—5 against mirror body frame 2 resulting in a fixing of the selected positions of mirror frame 2 and mirror support legs 5—5. Supply shelf 6 is attached to mirror support legs 5—5 by a hinge arrangement 8—8 and supported by a supply shelf support post 7. Waste container hooks 9 are placed on support leg 5 at opposite side of mirror frame body 2 from swsupply shelf 6 support leg 5. Flashlight holder clamp 10 is randomly placed on any mirror support leg 5.

FIG. 2 shows supply shelf 6 in retracted position, supply shelf support post 7 in retacted position, hinge arrangement 8, waste container hooks 9, flashlight holder clamp 10, shelf support anchor pin 11, disposal waste bag supplied by user 12, support post aassembly 13, supply shelf post retact clamp 14, supply shelf post anchor socket 15.

Figure 3:
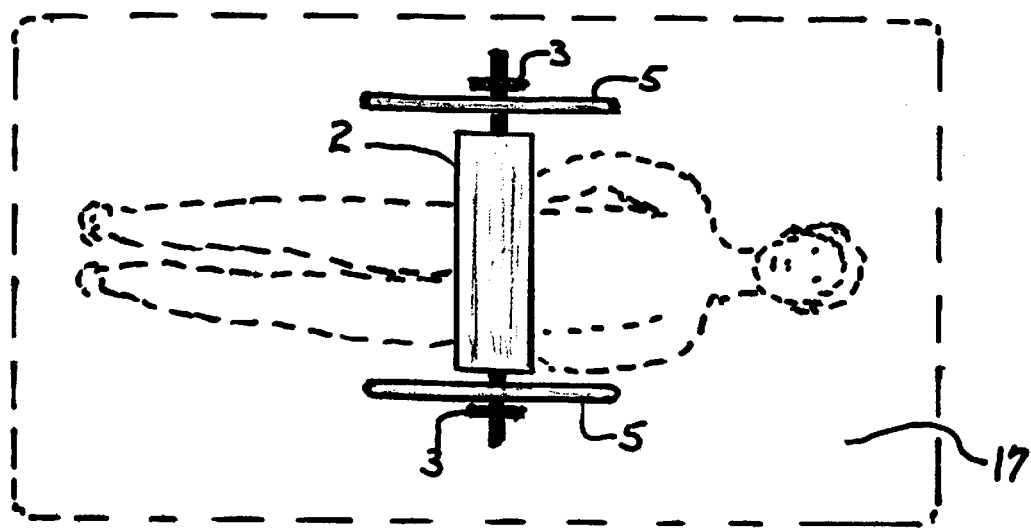
FIG. 3 is a top view of the device of FIG. 1 in a use position.

FIG. 3 indicates the position of the patient in relation to the medical mirror device to the surface-bed 17 while patient is lying in a prone position.

Figure 4:
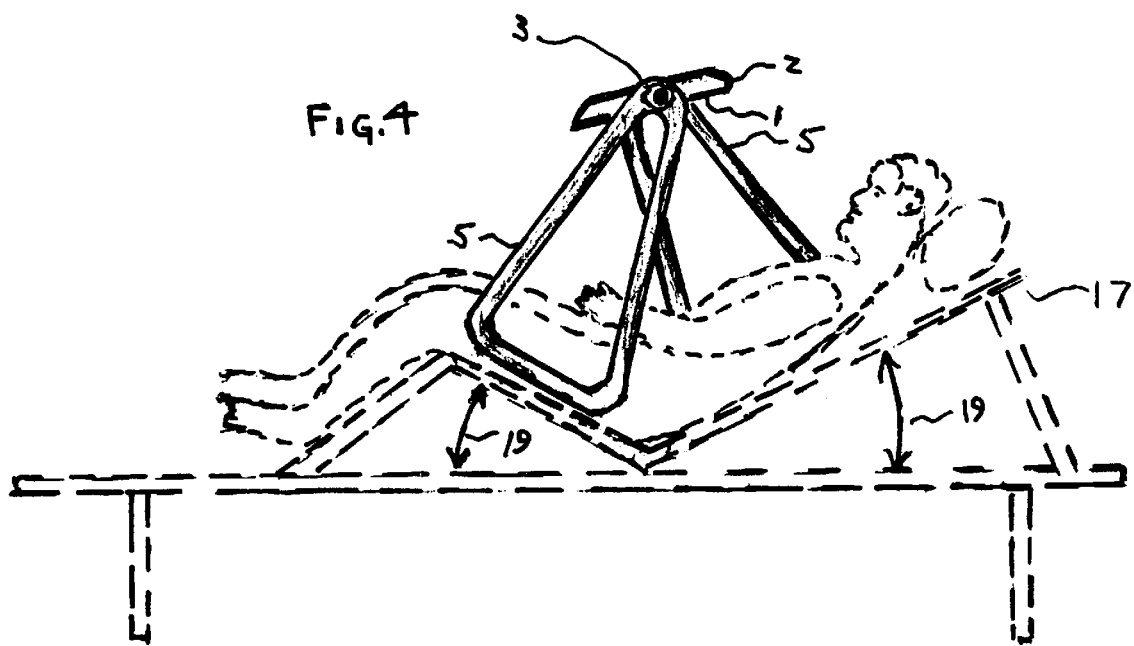
FIG. 4 is a side view of the device of FIG. 1 in an uneven non-parallel mode.

FIG. 4 indicates the position on a bed-surface 17 in an uneven non-parallel mode. with arrows 19 showing the variation from the flat surface mode. Mirror support legs 5—5 are in a non-parallel position while maintaining contact with bed surface 17 and supporting mirror support frame 2 in the use position.

FIG. 5 shows mirror support leg bases 5—5 in a common plane on resting surface.

FIG. 6 indicates the ability of mirror support legs 5—5 to rotate about tansverse axle 3—3 indicated by arrows 19—19. Mirror frame 2 maintains directional ability and stability by being able to pivot about transverse axle 3—3 through axle thimble holes 16—16 while maintaining a fixed position by torquing of the axle securing knobs 4—4.

The drawings and the foregoing descriptions are not intended to represent the only form of the invention in regard to the details of this construction and manner of operation. It will be evident to one skilled in the art that modifications and variations may be made without departing frrom the spirit and scope of the invention. Although specific terms have been employed, they have been intended to be in a generic and descriptive sense only and not for the purpose of limitation, the scope being delinated as follows;

I claim:

1. A medical mirror apparatus having a lightweight pivotable mirror-reflective surface and mirror-reflective surface body mounted in a rigid frame comprising a threaded transverse support axle;

a pair of support legs which suspend said mirror-reflective surface at a predetermined perpendicular distance from the base of each support leg to allow the user to see a reflection of the desired viewing area above any body obstructions;

a thimble hole passage at an apex of each of the support legs through which the support axle is passed to attach the mirror-reflective surface body to the support legs;

a pair of threaded securing knobs introduced onto the support axle for the purpose of torquing said securing knobs on said support axle to provide a sufficient frictional force between said mirror-reflective surface body and said support legs to secure said support legs in a selected fixed position;

a supply shelf secured to one of the support legs by a hinge arrangement at a connecting point between said supply shelf and said one of the support legs;

a retractable hinged support post secured on an underside of said supply shelf, said support post having a hinge on one end and a socket at the unhinged end which fits over a pin located on the base of said one of the support legs, said support post supporting said supply shelf in a position of use;

a support post clamp on the underside of said supply shelf which holds said support post in a retracted position when said supply shelf is in a retracted position for storage;

whereby positional selection of the mirror-reflective surface allows the user to direct sight to desired viewing areas;

and positional selection of the support legs allows the base of each support leg to rest on an uneven, non parallel or soft surface such as a bed while maintaining mirror body stability.

2. A medical mirror apparatus as in claim 1 further comprising a flashlight holding assembly which can be located at a plurality of positions along said support legs;

said flashlight holding assembly comprising a first clamp for securing the flashlight which holds the flashlight in position by frictional force;

a second clamp which can be snapped over a support leg member and is held in place by frictional force allowing the second clamp to rotate about said support leg;

a pivot pin connecting the first clamp and the second clamp allowing the first clamp to rotate about said pivot pin;

said flashlight holding assembly permitting adjustment of the light beam;

and a pair of hooks placed on the support leg not having the affixed supply shelf for the purpose of supporting a container for medical wastes.

* * * * *